US008775190B2

(12) United States Patent
Tanaka et al.

(10) Patent No.: US 8,775,190 B2

(45) Date of Patent: Jul. 8, 2014

(54) VOICE-OPERATED CONTROL CIRCUIT AND METHOD FOR USING SAME

(75) Inventors: Ryohei Tanaka, Torrance, CA (US); Christy Marie Torres, Long Beach, CA (US)

(73) Assignees: Ryohei Tanaka, Tokyo (JP); Christy Marie Torres, Long Beach, CA (US)

( * ) Notice: Subject to any disclaimer, the term of this patent is extended or adjusted under 35 U.S.C. 154(b) by 764 days.

(21) Appl. No.: 12/931,602

(22) Filed: Feb. 4, 2011

(65) Prior Publication Data

US 2012/0203558 A1 Aug. 9, 2012

(51) Int. Cl.

*G10L 21/00* (2013.01)
*A63H 30/00* (2006.01)
*G06F 17/00* (2006.01)

(52) U.S. Cl.

USPC .............................. 704/275; 446/275; 700/94

(58) Field of Classification Search

USPC ...................... 704/270–278; 700/94; 446/175
See application file for complete search history.

(56) References Cited

U.S. PATENT DOCUMENTS

| | | | | |
|---|---|---|---|---|
| 5,555,019 | A * | 9/1996 | Dole | 348/148 |
| 6,529,875 | B1 * | 3/2003 | Nakajima et al. | 704/275 |
| 7,713,127 | B1 * | 5/2010 | Torre-Bueno | 463/35 |
| 8,126,720 | B2 * | 2/2012 | Nakagawa et al. | 704/275 |
| 2001/0027398 | A1 * | 10/2001 | Kohno | 704/275 |
| 2004/0010414 | A1 * | 1/2004 | Tahara et al. | 704/275 |
| 2006/0020473 | A1 * | 1/2006 | Hiroe et al. | 704/275 |

* cited by examiner

*Primary Examiner* — Samuel G Neway
(74) *Attorney, Agent, or Firm* — David W. Ono

(57) ABSTRACT

A voice-operated control circuit and method for using the voice-operated control circuit in connection with a toy vehicle. The voice-operated control circuit contains an audio detector, such as a microphone, to detect audible sound signals, and an integrated circuit that determines the duration of the audible sound signals received by the audio detector. At a user-defined time and based on the audible sound signals received, the integrated circuit determines and controls the duration of operation of various components of the toy vehicle, such as a motor, lights and/or sounds.

33 Claims, 6 Drawing Sheets

VOICE-OPERATED CONTROL CIRCUIT AND METHOD FOR USING SAME

FIELD OF INVENTION

The present invention relates generally to voice-operated control circuits and their operation. More particularly, the present invention relates to voice-operated control circuits for use in the operation of toys, and more specifically, toy vehicles.

BACKGROUND OF THE INVENTION

Voice-operated control circuits are generally known in the art. In some prior art devices, expensive and/or complex voice recognition circuits or software are required. In other prior art devices, the received sounds are required to fall within a predetermined frequency range in order to provide functionality. In still other prior art devices, the devices are activated as soon as the received sounds exceed a predetermined volume, i.e., the devices are activated in real time with the reception of the sound.

It is desirable, therefore, to provide an inexpensive voice-operated control circuit that receives sound signals, determines the duration of the received sound signals, and activates one or more components at a user-defined time for a period of time dependent upon the duration of the received sound signals.

It is also desirable to provide an inexpensive voice-operated control circuit that receives sound signals, determines the duration of the received sound signals that fall within each of a plurality of decibel level ranges, and activates one or more components at a user-defined time for a period of time dependent upon the duration of the received sound signals that fall within each of the plurality of decibel level ranges.

It is further desirable to provide an inexpensive voice-operated control circuit that receives sound signals, determines the decibel level of the received sound signals, and activates one or more components at a user-defined time for a period of time dependent upon the highest decibel level achieved by the received sound signals.

SUMMARY OF THE INVENTION

The present invention provides for a voice-operated control circuit and method for using the voice-operated control circuit in connection with a toy, and more specifically, a toy vehicle. In a preferred embodiment of the present invention, the voice-operated control circuit comprises an audio detector circuit and an integrated circuit. The audio detector circuit comprises an audio detector, such as a microphone, to detect audible sound signals that are converted into corresponding electrical signals, a low-pass filter to filter out spikes in the electrical signals, and an amplifier to amplify the filtered electrical signals, which are passed to the integrated circuit. The integrated circuit determines the duration of the audible sound signals received by the audio detector by determining the total duration of the filtered and amplified electrical signals. At a user-defined time and based on the total duration of the electrical signals received, the integrated circuit determines and controls the duration of operation of various components of the toy vehicle, such as a motor, lights and/or sounds.

In another embodiment of the present invention, the audio detector circuit detects audible sound signals in a plurality of decibel level ranges (for example, 65-74 dB, 75-84 dB, and 85-94 dB). The integrated circuit determines the duration of the audible sound signals received in each of the plurality of decibel level ranges and determines the duration of operation of the toy vehicle based on those durations, wherein audible sound signals falling within higher decibel level ranges are weighted more heavily. By way of example only, if one second of audible sound signals is received in the 65-74 dB range and one second of audible sound signals is received in the 85-94 dB range, then the integrated circuit could cause the toy vehicle to operate for four seconds, with one second of operation attributed to the one second of audible sound signals received in the 65-74 dB range and three seconds of operation attributed to the one second of audible sound signals received in the 85-94 dB range.

In a further embodiment of the present invention, the audio detector circuit detects audible sound signals in a plurality of decibel level ranges and the integrated circuit determines the highest decibel level range in which the audible sound signals received falls and determines the duration of operation of the toy vehicle based on that highest decibel level range. By way of example only, if the highest decibel level range of the audible sound signals received falls in the 65-74 dB range, then the integrated circuit could cause the toy vehicle to operate for five seconds; and if the highest decibel level range of the audible sound signals received falls in the 85-94 dB range, then the integrated circuit could cause the toy vehicle to operate for twenty seconds.

A more complete understanding of the voice-operated control circuit of the present invention will be afforded to those skilled in the art, as well as a realization of additional advantages and objects thereof, by a consideration of the following detailed description. Reference will be made to the accompanying drawings which will first be described briefly.

DETAILED DESCRIPTION OF THE PREFERRED EMBODIMENTS

The present invention provides a voice-operated control circuit and a method for using the same. In the detailed description that follows, like reference numbers are used to indicate like elements appearing in one or more of the figures.

Figure 1:
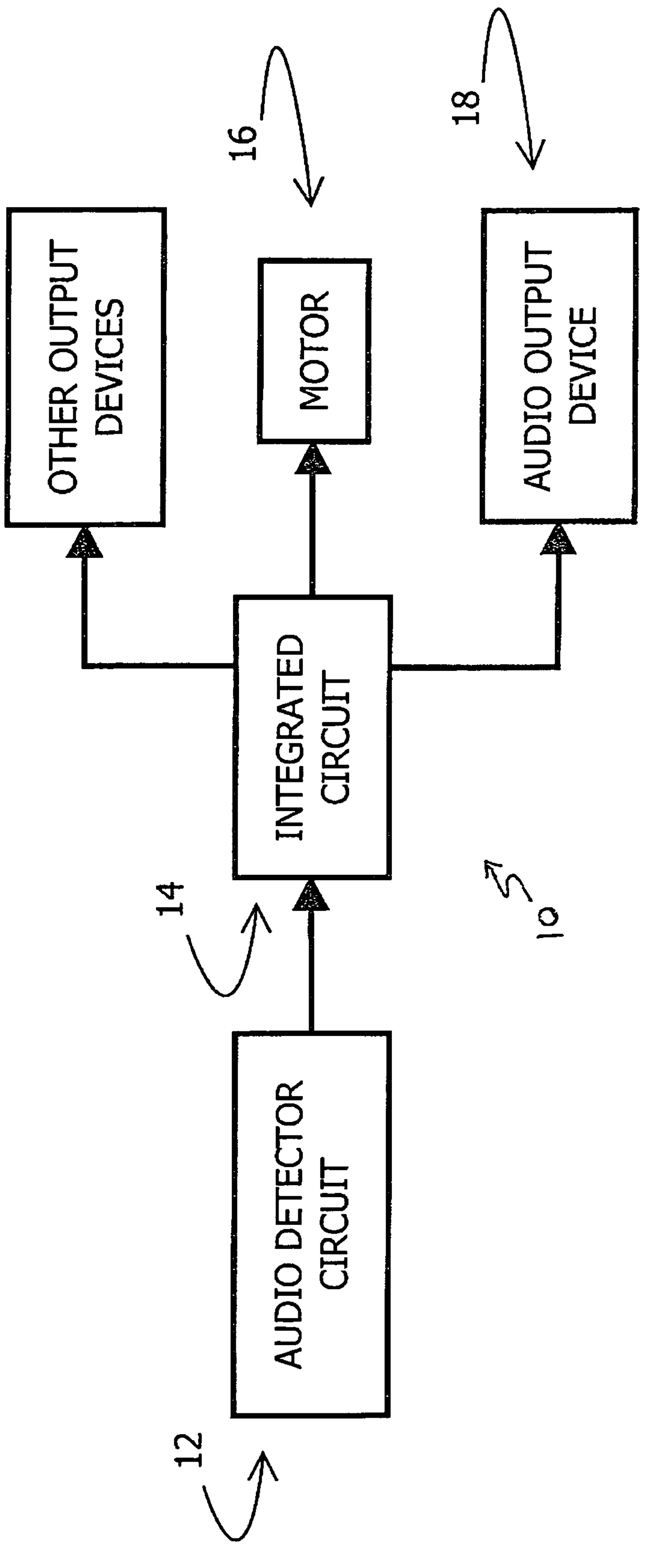
FIG. 1 is an exemplary block diagram of a voice-operated control circuit in accordance with the present invention.

FIG. 1 shows a voice-operated control circuit 10 for a toy or other electrical device that includes an audio detector circuit 12 and an integrated circuit 14. In a preferred embodiment of the present invention, the audio detector circuit 12 includes an audio detector, a low pass filter and an amplifier. The audio detector receives audible sound signals and converts the audible sound signals into an electrical A/C signal. The electrical signal is passed through the low-pass filter to eliminate high-frequency noise and the filtered electrical signal is amplified by the amplifier. The output of the audio detector circuit 12 is coupled with an input to the integrated circuit 14, which determines the duration of the amplified signal. In a preferred embodiment of the present invention, the integrated circuit 14 will only count the duration of the amplified signal if the amplified signal is of a minimum strength. The integrated circuit 14 also determines the duration that it does not receive an amplified signal of minimum strength. The integrated circuit 14 is further coupled to one or more output devices, such as a motor 16, an audio output device 18, or one or more light emitting devices. Accordingly, the integrated circuit 14 determines the duration of all received audible sound signals of a minimum decibel level and, based on that determination, calculates the duration in which to activate the output devices.

Figure 2:
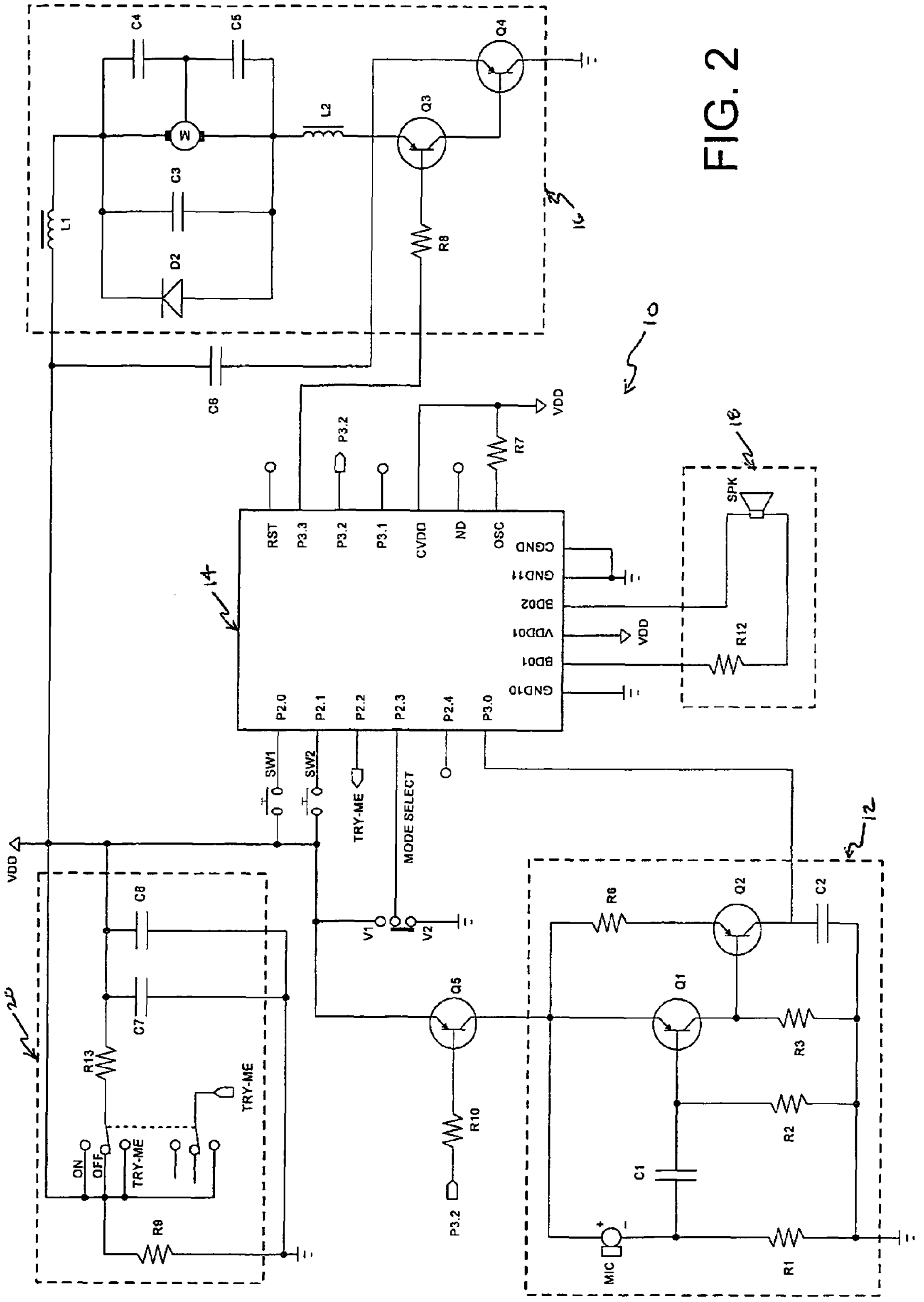
FIG. 2 is exemplary circuit schematic of the voice-operated control circuit of FIG. 1 in accordance with the present invention.

FIG. 2 shows an exemplary implementation of the voice-operated control circuit described in FIG. 1. The audio detector circuit 12 includes a microphone MIC and a biasing resistor R1. The negative terminal of the microphone MIC is coupled to the anode side of capacitor C1. The cathode side of capacitor C1 is coupled to rectifier R2 and to the base of transistor Q1. The collector of transistor Q1 is coupled to resistor R3 and the base of transistor Q2. The emitter of transistor Q2 is coupled to resistor R6 and the collector of transistor Q2 is coupled to capacitor C2. Resistors R1, R2 and R3 and capacitor C2 are further coupled to ground. The emitter of transistor Q1 and resistor R6 are coupled to the positive terminal of microphone MIC. In a preferred embodiment of the present invention, a SONIX SNC26018 one-channel voice speech controller is used for the integrated circuit 14. The output of audio detector circuit 12 is coupled to an input P3.0 of integrated circuit 14. The integrated circuit 14 also includes an oscillator input OSC, adjusted by a voltage dropped over resistor R7 and a voltage supply input VDD, which is coupled to a run time counter and a silence counter (not shown) for counting the duration of received audible sound signals and the absence of audible sound signals, respectively. The integrated circuit 14 further includes an output P3.2 for selectively enabling and disabling the audio detector circuit 12 by gating transistor Q5 via resistor R10.

The voice-operated control circuit 10 includes a mode selection switch coupled to an input P2.3 of the integrated circuit 14 for detecting one of a plurality of modes of operation. In a preferred embodiment of the present invention, the mode selection switch has two settings, V1 and V2, wherein the V1 setting places the voice-operated control circuit 10 into production mode and the V2 setting places the voice-operated control circuit 10 into test mode. The integrated circuit 14 further includes an input P2.2 for detecting the status of a "try-me" switch. In addition to the "try-me" switch, an on/off switch is included, along with suitable biasing components including resistors R9 and R13 and capacitors C7 and C8, on a switch circuit 20.

The voice-operated control circuit 10 includes a switch SW1 coupled to input P2.0 of the integrated circuit 14. The integrated circuit 14 also includes an output P3.3 for controlling the motor 16, and outputs BD01 and BD02 for controlling the audio output device 18. The audio output device 18 includes a speaker SPK along with a biasing resistor R12. The motor 16 includes a direct current motor M, transistors Q3 and Q4, a diode D2 along with suitable biasing components including resistor R8, inductors L1 and L2, and capacitors C3, C4 and C5. In one embodiment of a preferred invention, the voice-operated control circuit 10 includes an additional switch SW2 coupled to input P2.1 of the integrated circuit 14, wherein the operation of the toy vehicle is modified when both switches SW1 and SW2 are closed. For example, when both switches SW1 and SW2 are closed, the toy vehicle is used in connection with a play set, as opposed to operating a stand-alone toy. In a preferred embodiment of the present invention, the duration in which the motor runs is extended, such that the turning of the wheels can be used to drive gearing in the play set (to raise a ramp, for example) prior to causing the wheels to move the toy vehicle.

While FIG. 2 depicts one possible exemplary implementation of the voice-operated control circuit 10, it should be obvious to one skilled in the art that other circuit implementations utilizing other components or combinations of components may be implemented without departing from the broad inventive scope of the present invention.

Figure 3:
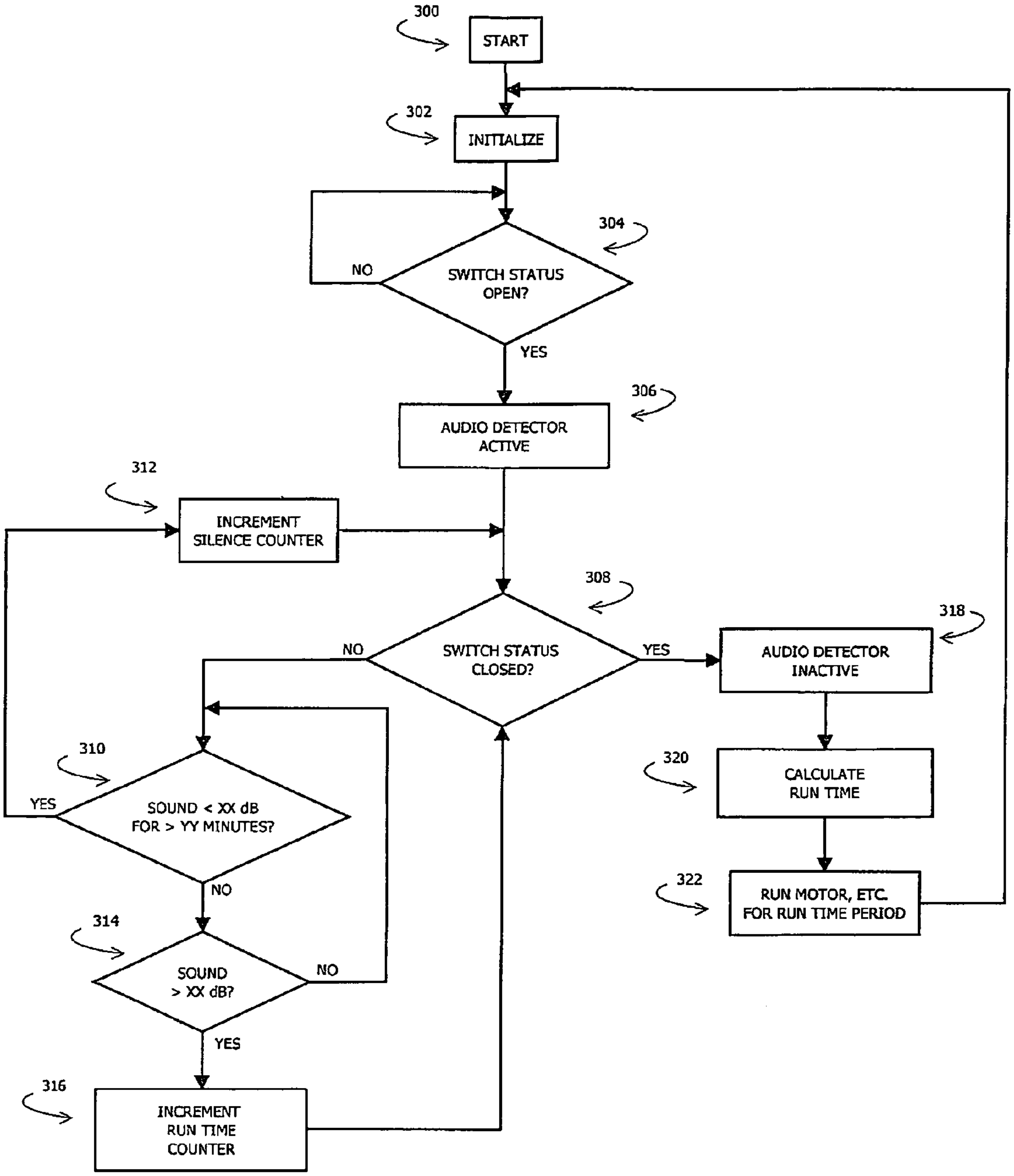
FIG. 3 is an exemplary flow diagram showing the steps of operating the voice-operated control circuit in accordance with the present invention.

FIG. 3 shows a flow diagram of exemplary steps in operating the voice-operated control circuit 10. In one embodiment of the present invention, the toy or electrical device that utilizes the voice-operated control circuit 10 is a toy car. After power is applied to the toy car (Step 300), the toy car is initialized and placed into default mode (Step 302). In default mode, the audio detector circuit 12 is inactive and the run time counter and the silence counter are cleared. After initialization (Step 302), the integrated circuit 14 checks if switch SW1 is open (Step 304). For example, the switch SW1 may be coupled with the wheel axle of the toy car, such that when the toy car is resting on a surface, the switch SW1 is open when the toy car is picked up off the surface. If switch SW1 is closed ("No" at Step 304), then the integrated circuit 14 continues to check if switch SW1 is open (Step 304).

If switch SW1 is open ("Yes" at Step 304), then the audio detector circuit 12 is active (Step 306). In a preferred embodiment of the present invention, after switch SW1 is open, the integrated circuit 14 introduces a delay (for example, 0.3 seconds) before activating the audio detector circuit 12 in order to reduce the chance of receiving unwanted noise by the audio detector circuit 12.

After Step 306, the integrated circuit 14 checks if switch SW1 has subsequently closed (Step 308). For example, switch SW1 may be closed when the toy car is placed on the surface. If switch SW1 is not closed ("No" at Step 308), then the integrated circuit 14 checks whether a predetermined period of time (e.g., three minutes) has passed since the audio detector circuit 12 has received sound of sufficient volume (e.g., greater than or equal to 65 dB) (Step 310). It should be obvious to one skilled in the art that the respective predetermined period of time and minimum volume levels can be modified to provide the desired functionality.

If the predetermined period of time has passed since the audio detector circuit 12 has received sound of sufficient volume ("Yes" at Step 310), then the silence counter is incremented (Step 312) and the integrated circuit 14 checks if switch SW1 is closed (Step 308). If the predetermined period of time has not passed ("No" at Step 310), then the integrated circuit 14 checks whether there is sound of sufficient volume is being received by audio detector circuit 12 (Step 314). If there is no sound of sufficient volume is being received by audio detector circuit 12 ("No" at Step 314), then the integrated circuit 14 again checks whether the predetermined period of time has passed since the audio detector circuit 12 received sound of sufficient volume (Step 310).

At Step 314, if sound of sufficient volume is being received by audio detector circuit 12 ("Yes" at Step 314), then the run time counter is incremented (Step 316) and the integrated circuit 14 checks if switch SW1 is closed (Step 308). If switch SW1 is closed ("Yes" at Step 306), then the audio detector circuit 12 is inactive (Step 318), the integrated circuit 14 calculates a run time period based on the run time counter value (Step 320) and the motor 16 and any other desired feature, such as lights and sound, are activated for the run time period (Step 322). After Step 322, the toy car is initialized and placed into default mode (Step 302).

Figure 4:
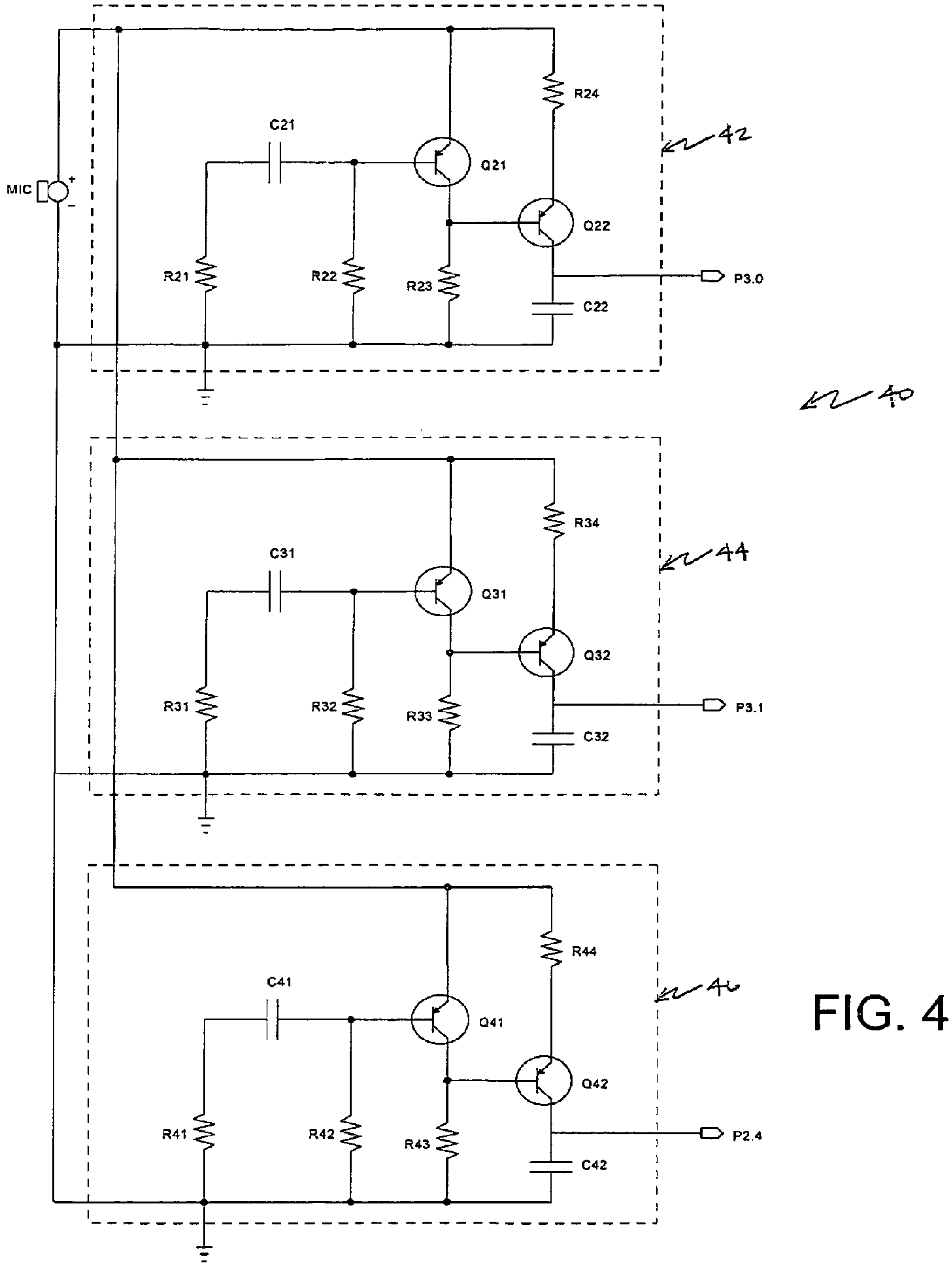
FIG. 4 is exemplary circuit schematic of an audio detector circuit in accordance with the present invention.

FIG. 4 shows an exemplary implementation of an audio detector circuit 40 for a toy or other electrical device, for use in lieu of the audio detector circuit 12 in FIGS. 1 and 2, to detect ranges of decibel levels in which the audible sound signals fall. A first circuit 42 of audio detector circuit 40 includes components R21, R22, R23, R24, C21, C22, Q21, Q22, a second circuit 44 of audio circuit 40 includes components R31, R32, R33, R34, C31, C32, Q31, Q32, and a third circuit 46 of audio circuit 40 includes components R41, R42, R43, R44, C41, C42, Q41, Q42. Each set of components (a) R21, R22, R23, R24, C21, C22, Q21, Q22, (b) R31, R32, R33, R34, C31, C32, Q31, Q32, and (c) R41, R42, R43, R44, C41, C42, Q41, Q42 are respectively configured identically to the set of components R1, R2, R3, R6, C1, C2, Q1, Q2 of audio detector 12 in FIG. 2. The collector of transistor Q21 is coupled to the input P3.0 of integrated circuit 14, the collector of transistor Q31 is coupled to an input P3.1 of integrated circuit 14, and the collector of transistor Q41 is coupled to an input P2.4 of integrated circuit 14. Accordingly, the first circuit 42 can be tuned to detect audio signals in a first decibel level range, by way of example only, 65-74 dB, the second circuit 44 can be tuned to detect audio signals in a second decibel level range, by way of example only, 75-84 dB, and the third circuit 46 can be tuned to detect audio signals in a third decibel level range, by way of examples only, 85-94 dB or 85-200 dB (effectively 75 dB+). It should be obvious to one skilled in the art that additional or gradations of ranges may be achieved by adding additional circuits having components of different values configured identically to the components R1, R2, R3, R6, C1, C2, Q1, Q2 of audio detector 12. Furthermore, while FIG. 4 depicts one possible exemplary implementation of the audio detector circuit 40, it should be obvious to one skilled in the art that other circuit implementations utilizing other components or combinations of components may be implemented without departing from the broad inventive scope of the present invention.

Figure 5:
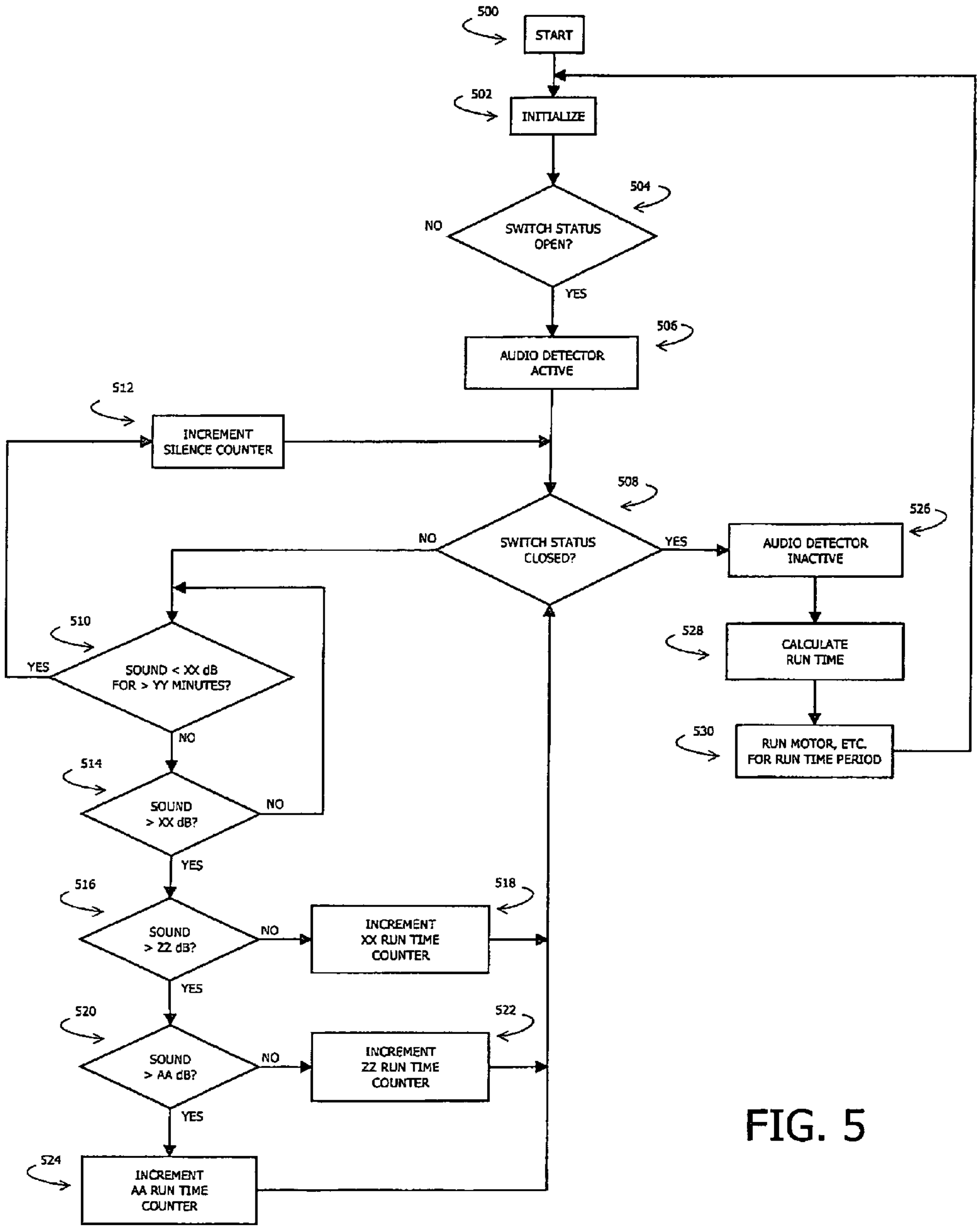
FIG. 5 is an exemplary flow diagram showing the steps of operating the voice-operated control circuit in accordance with the present invention.

FIG. 5 shows a flow diagram of another set of exemplary steps in operating the voice-operated control circuit 10. Steps 500 to 512 are identical to Steps 300 to 312 of FIG. 3. At Step 514, if sound of sufficient volume is being received by audio detector circuit 12 ("Yes" at Step 514), then the integrated circuit 14 determines if the sound falls within a first decibel range (e.g. XX-ZZ) (Step 516). If the sound falls within the first decibel range ("No" at Step 516), then a first associated counter is incremented (Step 518) and the integrated circuit 14 checks if switch SW1 is closed (Step 508). If the sound exceeds the first decibel range ("Yes" at Step 516), then the integrated circuit 14 determines if the sound falls within a second decibel range (e.g. ZZ-AA) (Step 520). If the sound falls within the second decibel range ("No" at Step 520), then a second associated counter is incremented (Step 522) and the integrated circuit 14 checks if switch SW1 is closed (Step 508). If the sound exceeds the second decibel range ("Yes" at Step 520), then a third associated counter is incremented (Step 524) and the integrated circuit 14 checks if switch SW1 is closed (Step 508). If switch SW1 is closed ("Yes" at Step 508), then the audio detector circuit 40 is inactive (Step 526), the integrated circuit 14 calculates a run time period based on the first associated counter, second associated counter and third associated counter values (Step 528) and the motor 16 and any other desired feature, such as lights and sound, are activated for the run time period (Step 530). After Step 530, the toy car is initialized and placed into default mode (Step 502).

Figure 6:
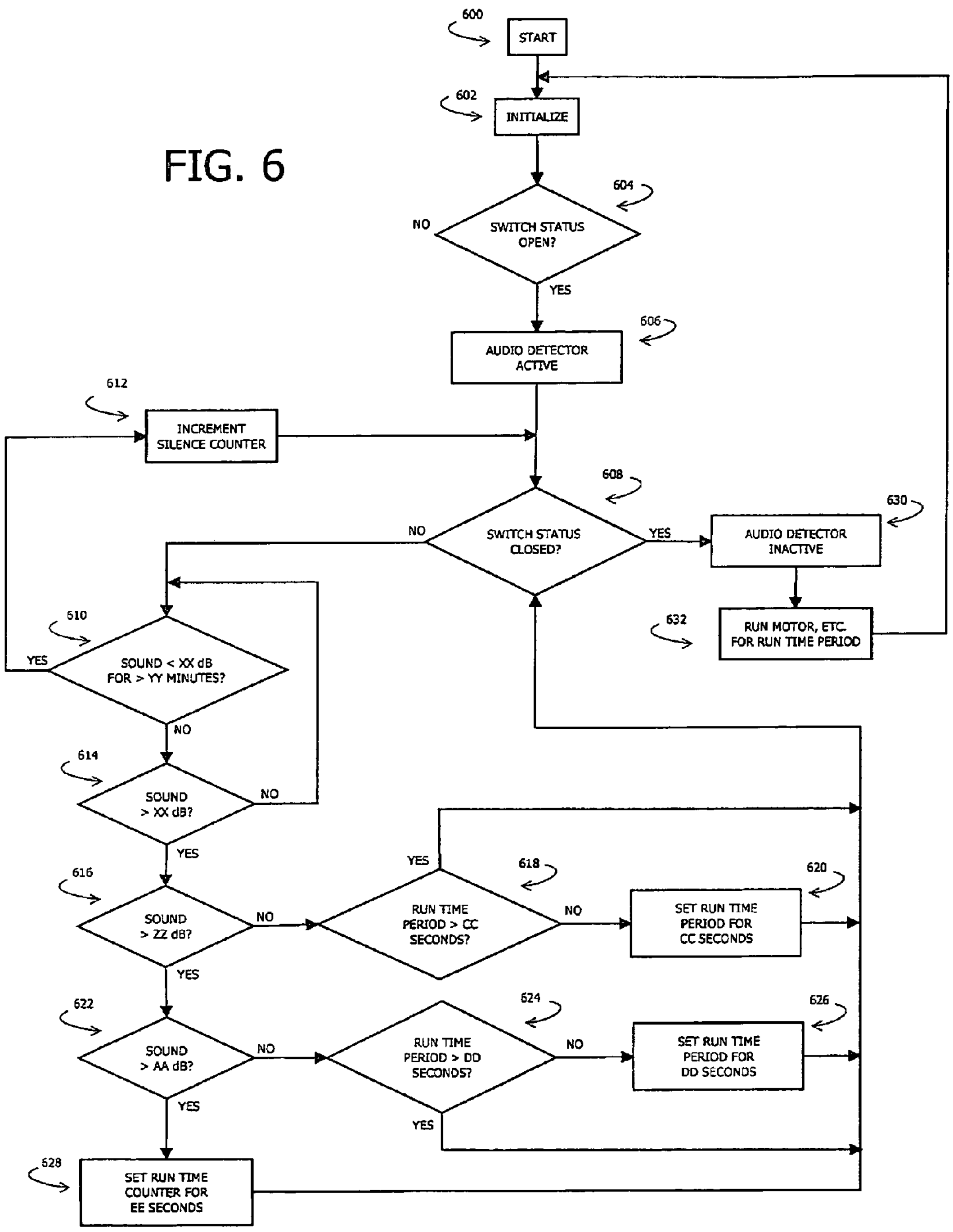
FIG. 6 is an exemplary flow diagram showing the steps of operating the voice-operated control circuit in accordance with the present invention.

FIG. 6 shows a flow diagram of yet another set of exemplary steps in operating the voice-operated control circuit 10. Steps 600 to 612 are identical to Steps 300 to 312 of FIG. 3. At Step 614, if sound of sufficient volume is being received by audio detector circuit 12 ("Yes" at Step 614), then the integrated circuit 14 determines if the sound falls within a first decibel range (e.g. XX-ZZ) (Step 616). If the sound falls within the first decibel range ("No" at Step 616), then the integrated circuit 14 checks whether a run time period has been set for a period greater than a first specified period (Step 618). If the run time period has been set for a period greater than the first specified period ("Yes" at Step 618), then the integrated circuit 14 checks if switch SW1 is closed (Step 608). If the run time period is set for a period less than the first specified period ("No" at Step 618), then the run time period is set for the first specified period (Step 620) and the integrated circuit 14 checks if switch SW1 is closed (Step 608). If the sound exceeds the first decibel range ("Yes" at Step 616), then the integrated circuit 14 determines if the sound falls within a second decibel range (e.g. ZZ-AA) (Step 622). If the sound falls within the second decibel range ("No" at Step 622), then the integrated circuit 14 checks whether a run time period has been set for a period greater than a second specified period (Step 624). If the run time period has been set for a period greater than the second specified period ("Yes" at Step 624), then the integrated circuit 14 checks if switch SW1 is closed (Step 608). If the run time period has been set for a period less than the second specified period ("No" at Step 618), then the run time period is set for the second specified period (Step 626) and the integrated circuit 14 checks if switch SW1 is closed (Step 608). If the sound exceeds the second decibel range ("Yes" at Step 622), then the run time period is set for a third specified period (Step 628) and the integrated circuit 14 checks if switch SW1 is closed (Step 608). If switch SW1 is closed ("Yes" at Step 608), then the audio detector circuit 40 is inactive (Step 630) and the motor 16 and any other desired feature, such as lights and sound, are activated for the run time period (Step 632). After Step 632, the toy car is initialized and placed into default mode (Step 602).

Having thus described a preferred embodiment of a voice-operated control circuit and a method for using the same, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A voice-operated control circuit for a toy vehicle comprising:
- an audio detector circuit for receiving audible sound signals;
- a switch having an open position and a closed position;
- a motor; and
- an integrated circuit coupled to the audio detector circuit, said integrated circuit configured to determine, from when said switch is in its open position to when said switch is in its closed position, the cumulative duration in which audible sound signals greater than a predetermined decibel level are received by said audio detector circuit, to calculate a period based on said cumulative duration, and to provide output signals to activate said motor for said period.

2. The voice-operated control circuit according to claim 1, wherein said switch is placed in said open position when said toy vehicle is picked up off a surface and said switch is placed in said closed position when said toy vehicle is placed on the same or other surface.

3. The voice-operated control circuit according to claim 1, further comprising an audio output device, wherein said integrated circuit provides second output signals to activate said audio output device.

4. The voice-operated control circuit according to claim 1, further comprising one or more light emitting devices, wherein said integrated circuit provides third output signals to activate said one or more light emitting devices.

5. The voice-operated control circuit according to claim 1, further comprising a second switch having a first position and a second position, wherein when said switch is placed in said closed position and said second switch is placed in said second position said toy vehicle is configured to operate in connection with a play set.

6. The voice-operated control circuit according to claim 1, wherein said integrated circuit is configured to determine the cumulative duration in which said audio detector circuit does not receive audible sound signals greater than said predetermined decibel level.

7. A voice-operated control circuit for a toy vehicle comprising:

an audio detector circuit for receiving audible sound signals;

a switch having an open position and a closed position;

a motor; and an integrated circuit coupled to the audio detector circuit, said integrated circuit configured to determine, from when said switch is in its open position to when said switch is in its closed position, the duration in which audible sound signals are received by said audio detector circuit within each of a plurality of decibel level ranges, to calculate a period based on said duration in which audible sound signals are received by said audio detector circuit within each of said plurality of decibel level ranges, and to provide output signals to activate said motor for said period.

8. The voice-operated control circuit according to claim 7, wherein said switch is placed in said open position when said toy vehicle is picked up off a surface and said switch is placed in said closed position when said toy vehicle is placed on the same or other surface.

9. The voice-operated control circuit according to claim 7, further comprising an audio output device, wherein said integrated circuit provides second output signals to activate said audio output device.

10. The voice-operated control circuit according to claim 7, further comprising one or more light emitting devices, wherein said integrated circuit provides third output signals to activate said one or more light emitting devices.

11. The voice-operated control circuit according to claim 7, further comprising a second switch having a first position and a second position, wherein when said switch is placed in said closed position and said second switch is placed in said second position said toy vehicle is configured to operate in connection with a play set.

12. The voice-operated control circuit according to claim 7, wherein said integrated circuit is configured to determine the cumulative duration in which said audio detector circuit does not receive audible sound signals greater than said predetermined decibel level.

13. A voice-operated control circuit for a toy vehicle comprising:

an audio detector circuit for receiving audible sound signals;

a switch having an open position and a closed position;

a motor; and an integrated circuit coupled to the audio detector circuit, said integrated circuit configured to determine, from when said switch is in its open position to when said switch is in its closed position, the decibel levels of audible sound signals received by said audio detector circuit, and to provide output signals to activate said motor for a period based on the highest decibel level received by said audio detector circuit.

14. The voice-operated control circuit according to claim 13, wherein said switch is placed in said open position when said toy vehicle is picked up off a surface and said switch is placed in said closed position when said toy vehicle is placed on the same or other surface.

15. The voice-operated control circuit according to claim 13, further comprising an audio output device, wherein said integrated circuit provides second output signals to activate said audio output device.

16. The voice-operated control circuit according to claim 13, further comprising one or more light emitting devices, wherein said integrated circuit provides third output signals to activate said one or more light emitting devices.

17. The voice-operated control circuit according to claim 13, further comprising a second switch having a first position and a second position, wherein when said switch is placed in said closed position and said second switch is placed in said second position said toy vehicle is configured to operate in connection with a play set.

18. The voice-operated control circuit according to claim 13, wherein said integrated circuit is configured to determine the cumulative duration in which said audio detector circuit does not receive audible sound signals greater than said predetermined decibel level.

19. A method of controlling a toy vehicle having a motor comprising the steps of:

receiving sound signals;

determining the duration of the received sound signals; and activating said motor at a user-defined time for a period dependent upon the duration of the received sound signals.

20. The method according to claim 19, wherein said activating said motor at said user-defined time occurs when said toy vehicle is placed on a surface.

21. The method according to claim 19, wherein said step of receiving sound signals occurs after said toy vehicle is picked up off of a surface.

22. The method according to claim 19, further comprising the step of activating an audio output device for said period.

23. The method according to claim 19, further comprising the step of activating one or more light emitting devices for said period.

24. A method of controlling a toy vehicle having a motor comprising the steps of:

receiving sound signals;

determining the duration of the sound signals within each of a plurality of decibel level ranges; and activating said motor at a user-defined time for a period dependent upon the duration of the sound signals received within each of the plurality of decibel level ranges.

25. The method according to claim 24, wherein said activating said motor at said user-defined time occurs when said toy vehicle is placed on a surface.

26. The method according to claim 24, wherein said step of receiving sound signals occurs after said toy vehicle is picked up off of a surface.

27. The method according to claim 24, further comprising the step of activating an audio output device for said period.

28. The method according to claim 24, further comprising the step of activating one or more light emitting devices for said period.

29. A method of controlling a toy vehicle having a motor comprising the steps of:

receiving sound signals;

determining the duration of the received sound signals; and activating said motor at a user-defined time for a period dependent upon the highest decibel level of the received sound signals.

30. The method according to claim 29, wherein said activating said motor at said user-defined time occurs when said toy vehicle is placed on a surface.

31. The method according to claim 29, wherein said step of receiving sound signals occurs after said toy vehicle is picked up off of a surface.

32. The method according to claim 29, further comprising the step of activating an audio output device for said period.

33. The method according to claim 29, further comprising the step of activating one or more light emitting devices for said period.

* * * * *